United States Patent [19]

Clark

[11] Patent Number: 4,968,879

[45] Date of Patent: Nov. 6, 1990

[54] METHOD AND APPARATUS FOR MEASURING AIRCRAFT FLIGHT PARAMETERS

[75] Inventor: Larry T. Clark, Enumclaw, Wash.

[73] Assignee: The Boeing Company, Seattle, Wash.

[21] Appl. No.: 226,076

[22] Filed: Jul. 29, 1988

[51] Int. Cl.⁵ .............................................. H01J 5/16
[52] U.S. Cl. ........................... 250/227.11; 250/231.10
[58] Field of Search .................... 250/227, 231 R, 342, 250/458.1, 459.1; 374/161, 162, 131, 121; 73/180; 340/967

[56] References Cited

U.S. PATENT DOCUMENTS

| | | | |
|---|---|---|---|
| 2,512,278 | 6/1950 | Jones | 73/180 |
| 2,736,198 | 2/1956 | Kuhn . | |
| 3,120,364 | 2/1964 | Stalony-Dobrzanski . | |
| 3,579,775 | 5/1971 | Carlson | 374/131 |
| 3,800,592 | 4/1974 | Jones, Jr. . | |
| 4,230,290 | 10/1980 | Townsend et al. . | |
| 4,408,827 | 10/1983 | Guthrie | 374/131 |
| 4,814,764 | 3/1989 | Middleton | 340/967 |

Primary Examiner—David C. Nelms
Assistant Examiner—Khaled Shami
Attorney, Agent, or Firm—Seed and Berry

[57] ABSTRACT

Various aircraft flight parameters are determined based on the thermal radiation emitted from a plurality of members while the aircraft is flying. A fiberoptic cable is positioned adjacent the member emitting the thermal radiation. A thermal radiation sensor receives, through the fiberoptic cable, the radiation emitted by the member and generates an electrical signal corresponding to the radiation emitted. For an aircraft traveling at high speeds, the heat flux generated across the skin surface by air friction is proportional to the velocity and angle of attack at a given air density. An on-board computer calculates various aircraft flight parameters, such as velocity, angle of attack of various aircraft surfaces, and the like, based on the signals received from the radiation sensors. Aircraft flight parameters are more rapidly and accurately determined than possible in the prior art.

27 Claims, 6 Drawing Sheets

METHOD AND APPARATUS FOR MEASURING AIRCRAFT FLIGHT PARAMETERS

DESCRIPTION

1. Government Rights

This invention was made with U.S. Government support under Contract No. F33657-86-C-0061, awarded by the U.S. Department of the Air Force. The U.S. Government has certain rights in this invention.

2. TECHNICAL FIELD

This invention relates to a device and method for measuring aircraft flight parameters, and more particularly, to rapidly sensing the attitude and velocity of a supersonic aircraft.

3. Background Art

Optimum control of an aircraft is achieved when particular aircraft flight parameters are known. In high-performance aircraft, such as combat aircraft, flying at supersonic or hypersonic speeds, improved performance is achieved when aircraft parameters such as velocity, aircraft attitudes (that is, pitch, yaw and roll), the angle of various flight surfaces to the airflow stream, and the like are known. Continuously monitoring, sensing and storing the various flight parameters in a control computer and displaying them to the pilot aid in providing improved performance.

The precise, rapid and accurate measurement of aircraft flight parameters relative to the flow stream is very difficult for high-performance, supersonic and hypersonic vehicles. One difficulty in measuring flight parameters of supersonic and hypersonic vehicles is the severe thermal environment and broad range of temperature fluctuations at the skin of the aircraft. Typical temperatures on the nose and leading edges of the wings are often in the range of 1800°–2200° F.

Because the aircraft is moving very rapidly, measurements of the aircraft attitude and speed must be very rapid to permit safe and accurate control of the aircraft. Rapid measurement and conversion to electrical signals are especially important if the aircraft control is partially or wholly governed by an onboard computer. In order to provide optimum control of the aircraft, the computer needs nearly instantaneous feedback of the current aircraft flight parameters to indicate whether the aircraft is in the proper position of if further action may be necessary to affect the pilot's command.

Prior art approaches to measuring various aircraft parameters, such as velocity and attitudes, are not operable in the supersonic and hypersonic airplanes. Presently, pressure transducers are used to measure these data and provide the necessary information. Conventional pressure transducers are not suitable for use in the severe thermal environment to which the skin of the aircraft is subjected. If pneumatic lines are used to isolate the pressure transducer from the hot skin surface, the frequency response of the measurement will be too slow to provide an adequate control signal. Other approaches of the prior art are not suitable for measuring the flight parameters necessary for control of a high-speed supersonic or hypersonic aircraft.

SUMMARY OF THE INVENTION

It is therefore an object of this invention to provide an apparatus for rapidly measuring various flight parameters of an aircraft traveling at high supersonic or hypersonic speeds, including attitude, velocity, angle of attack and the like.

It is a further object of this invention to provide a method of rapidly and accurately determining the attitude, velocity and other aircraft flight parameters while the aircraft is traveling at high supersonic or hypersonic speeds.

It is a further object of this invention to provide an apparatus for sensing the thermal radiation from particular locations on the aircraft and analyzing the thermal radiation from at least two different locations on the aircraft to determine an aircraft flight parameter.

These and other objects of the invention are accomplished by providing a thermal radiation sensor for sensing thermal radiation from the skin of the aircraft. A fiberoptic cable is coupled between the thermal radiation sensor and the skin of the aircraft for transferring the emitted radiation to the sensor. The radiation emitted by the skin at different locations of the aircraft is analyzed to determine various aircraft attitudes. The velocity is also determined based on the emitted radiation. Various other flight parameters may be determined from the thermal radiation from particular parts of the aircraft.

DETAILED DESCRIPTION OF THE INVENTION

Figure 1:
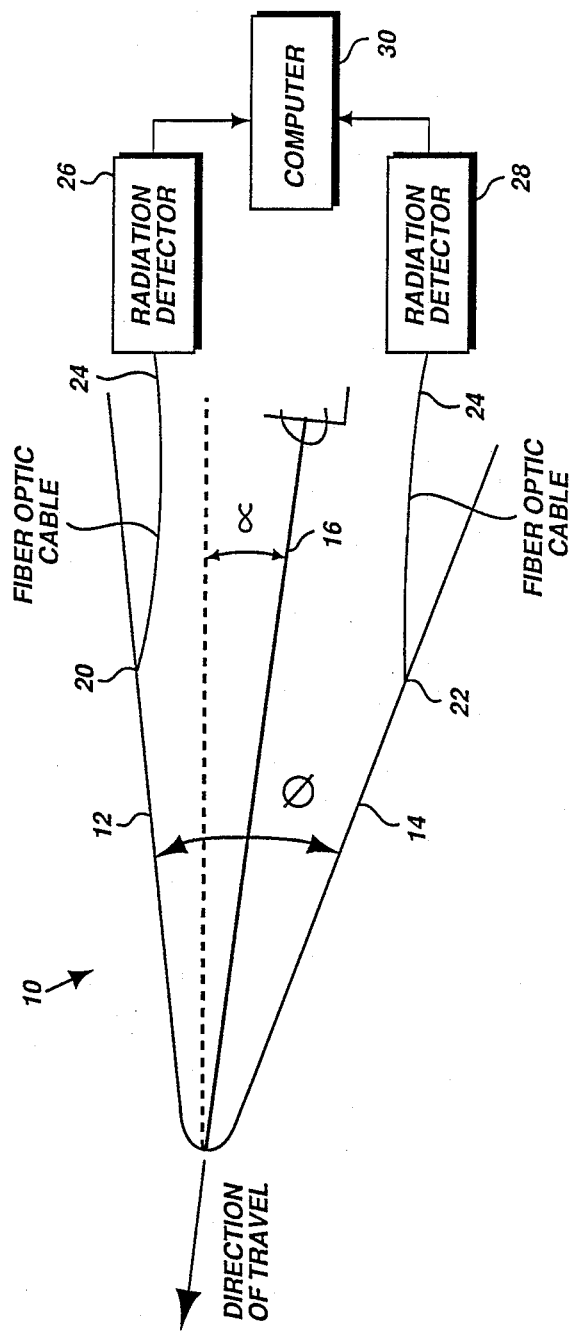
FIG. 1 is a partial cross-sectional view of a leading edge of an aircraft structure illustrating an angle of attack.

An aircraft member, designated generally as 10, includes exposed skin surfaces 12 and 14. While the member 10 as shown is the nose of the aircraft, any other members, such as a curved wing surface, rudder, elevator or other aircraft skin surface member, may be used. The aircraft member 10 includes a center plane 16 and an angle $\theta$ between surfaces 12 and 14. The aircraft member 10 has an attitude angle $\alpha$. When member 10 is the nose of the aircraft, the angle of attack, $\alpha$, illustrated in FIG. 1, is the pitch of the aircraft as the aircraft climbs or dives. Other aircraft attitudes, such as the yaw and roll, may also be measured according to this invention following the same principles used in measuring the pitch.

The upper skin surface 12 includes a thermal radiation member 20, and the lower skin surface of the aircraft member includes a thermal radiation member 22. Fiberoptic cables 24 are mounted directly adjacent the thermal radiation members 20 and 22 for guiding the thermal radiation to respective radiation detectors 26 and 28. The quantity of thermal radiation emitted to the sensors 26 and 28 is detected, and an electrical signal is generated corresponding to the quantity of thermal radiation received. The number of photons emitted by the respective thermal radiation members 20 and 22 and transported along fiberoptic cables 24 is measured, and an electrical signal is generated indicative of the number of photons received by the radiation sensors 26 and 28. The sensors 26 and 28 are sensitive to radiation over a selected bandwidth of frequencies. Generally, the sensors are selected to be sensitive to infrared radiation, though visible light or ultraviolet radiation may be sensed if desired. A bandwidth is selected to provide an accurate measure of the total radiation emitted by the thermal radiation members.

Radiation sensors 26 and 28 transmit the electrical data to the aircraft control center, such as computer 30. The data are analyzed in the computer 30 to determine aircraft flight parameters such as velocity and attitude. The aircraft flight parameters are used by either the computer, the pilot, or both, to control the aircraft.

The quantity of thermal radiation emitted by radiation members 20 and 22 is directly proportional to the temperatures of the radiating members. Assuming the radiation members 20 and 22 are black bodies, the relationship between the thermal radiation and the temperature of the radiation member is given by the StefanBoltzmann law as follows:

$$E = \sigma T^4 \qquad (1)$$

As the aircraft travels through the air, the friction from the air causes significant heating of the exposed skin surfaces of the aircraft, particularly leading edges. The temperature of the skin of an aircraft flying at high supersonic or hypersonic speeds is proportional to the angle of the skin surface with respect to the flow stream of air for a given velocity of the aircraft at a given air density. Further, at a given air density and angle of attack, the heating due to air friction is proportional to the velocity of aircraft in the air.

Figure 5:
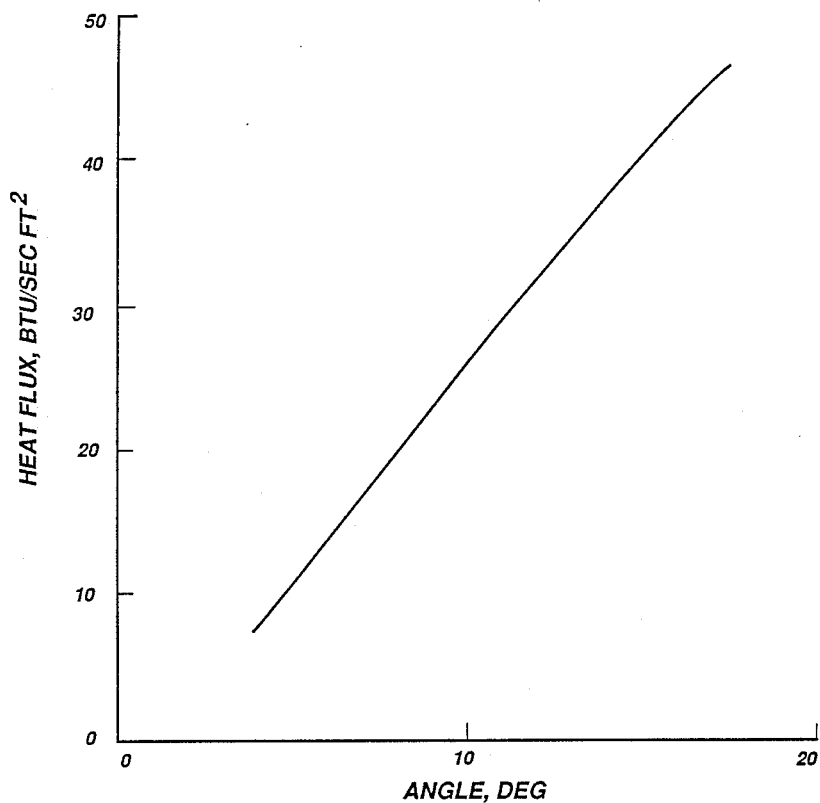
FIG. 5 is a graph illustrating the variation in the heat flux of an aircraft skin surface as the angle of attack of the skin surface varies.

The relationship between the angle of attack of the skin surface and the heat flux of the skin surface is illustrated in FIG. 5. FIG. 5 is based on a leading edge of an aircraft having a radius of four inches, a constant air density, and a constant aircraft speed as the angle of the skin surface varies. When the angle of the skin surface with respect to the airflow is between 5° and approximately 20°, the heat flux of the skin surface due to air friction is generally linear, as can be seen from FIG. 5.

In the member 10 shown, skin surfaces 12 and 14 are separated by an angle $\theta$ and extended uniformly from the center plane 16, as shown in FIG. 1. The angle of attack can be determined by measuring the difference between the thermal radiation emitted by members 20 and 22. The members 20 and 22 are both traveling at the same velocity; and the air stream over each, for the surface shape shown, is at the same density. Therefore, any differences in the thermal radiation between the members correspond to differences in angle of the skin with respect to the airflow. For example, assuming $\theta$ is 10° and $\alpha$ is zero, then the angle of attack of the nose of the plane is zero and the radiation emitted by the respective members 20 and 22 will be equal. When $\alpha$ is zero, the heat flux across each surface 12 and 14 corresponds to an angle of 5° at a given velocity and air density, as shown in FIG. 5. If the aircraft member 10 has a positive angle of attack, the thermal radiation emitted by member 22 is greater than the thermal radiation emitted by member 20. The member 10 as illustrated in FIG. 1, has a positive angle of attack. The exact value of the angle of attack is determined based on the difference in emitted thermal radiation between the members 20 and 22 using the graph of FIG. 5. Similarly, if the thermal radiation emitted by member 20 is greater than that emitted by member 22, then the angle of attack is downward and the value can be calculated easily from the difference.

An alternative and preferred method of determining the angle of attack or other aircraft flight parameter, FP, is to divide the difference between the upper and lower (or left side and right side) thermal radiation members by the sum of their thermal radiation as follows:

$$FP = \frac{E_L - E_U}{E_L + E_U} \qquad (2)$$

where $E_L$ is the thermal radiation emitted by the lower member and $E_U$ is the thermal radiation emitted by the upper member. Equation 2 yields a ratio which is sensitive to small changes in angles of attack and precisely determines the attitude of the aircraft in the respective plane. The advantage of a ratio is that the dimensions cancel to yield a number independent of velocity, air density and the like. Other methods of analyzing the thermal radiation emitted by the members 20 and 22 to determine the attitude of the aircraft may also be used.

The yaw, roll and other attitudes may be calculated using appropriately placed thermal radiators and sensors. For each attitude to be sensed, two thermal radiators are placed on either side of the axis of interest. For each aircraft member or aircraft flight parameter of interest, the radiation emitted by two or more sensors appropriately placed can be compared and analyzed to determine the flight status, as has been described with respect to determining the pitch of the nose. For example, to measure the pitch of a member, thermal radiators may be positioned on an upper and lower surface, and to measure yaw of a member, thermal radiators may be positioned on left and right surfaces, etc.

If the aircraft member 10 does not extend uniformly with respect to a desired plane of measurement, such as in a wing member, the nose of some aircraft, etc., the attitude analysis must take into account differences in angles of the surfaces with respect to each other, differences in air density, and airflow patterns over the different surfaces, and possibly numerous other factors. Compensation factors for differences in the surface shapes may be determined in the calibration procedure of the instrument and used in the calculations performed by the computer.

The velocity of the aircraft can be determined from one or a sum of a plurality of radiation sensors, given air density. The air density is independently determined. At a given angle of attack and air density, the velocity is proportional to the thermal radiation emitted.

A significant advantage of the present invention is the rapid rate at which the changes in attitude of the aircraft can be sensed, analyzed and used to control the aircraft and provide data to the pilot. The thermal radiation emitted by members 20 and 22 changes rapidly following a change in attitude of the aircraft. Photons are transmitted along the fiberoptic cables 24 at the speed of light and are immediately sensed by radiation detectors 26 and 28. The appropriate electrical signal is rapidly generated and analyzed in computer 30. The response time of the aircraft attitude measuring device is significantly faster than that of devices presently available for high-speed aircraft. This permits more precise and accurate control of the aircraft by the pilot and the onboard computer than previously possible.

Figure 2:
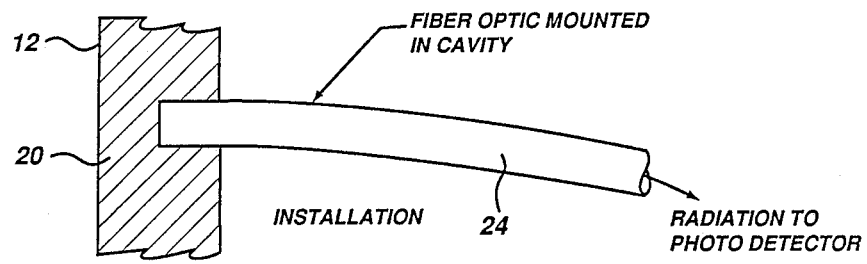
FIG. 2 is a partial cross-sectional view of a fiberoptic cable mounted within the skin of the aircraft.

The fiberoptic cable may be mounted a variety of ways with respect to the thermal radiator. As illustrated in FIG. 2, the fiberoptic cable 24 may be mounted in a cavity formed in the skin member 12, the skin member itself being thermal radiation member 20. The thermal radiation emitted from the cavity of a body more closely approximates the radiation emitted by a black body member than radiation emitted from a point on the surface of the member. Sapphire fiberoptic cables may be used to withstand the harsh thermal environment. The tip of the fiberoptic cable may also be coated with a thin film of aluminum oxide to provide a thermal match and permit the radiation member 20 to more closely approximate a black body cavity.

Figure 3:
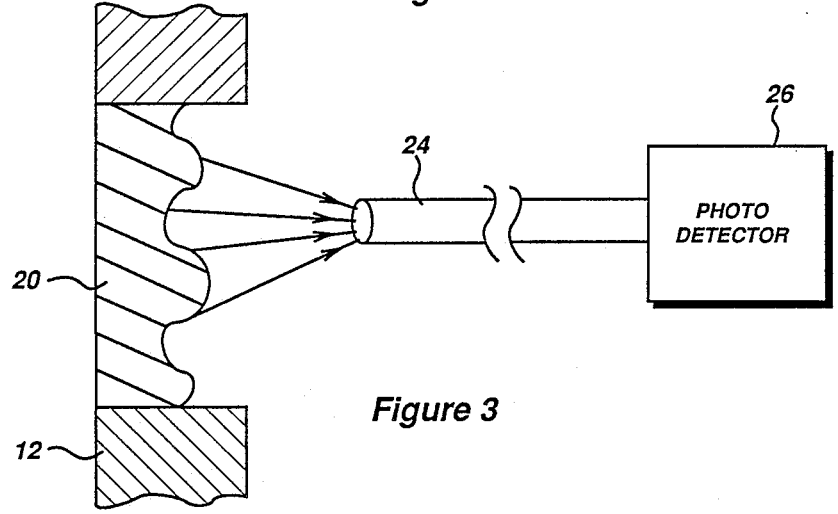
FIG. 3 is a partial cross-sectional view of the fiberoptic cable mounted adjacent a thermal radiation member in the skin of the aircraft.

Alternatively, as shown in FIG. 3, the fiberoptic cable 24 may be mounted physically separated from the thermal radiation member 20. The fiberoptic cable 24 may be mounted in direct contact with the surface of the radiation member 20 or spaced various distances therefrom, from a few microns to an inch or more away, if desired. Mounting the fiberoptic cable 24 spaced apart from the thermal member 20 may be required in the event the thermal member 20 reaches temperatures above the safe operating temperature of the fiberoptic member. Further, as the thermal radiation member 20 changes in temperature, thermal mismatches between the member 20 and the cable 24 may cause undesirable reflection, amplification, or interference with the radiation pattern transmitted along the fiberoptic cable 24, depending on the materials selected for member 20 and cable 24.

In the embodiment of FIG. 3, the member 20 is a mounted to be in direct contact with the airflow across one face and is sufficiently thin that changes in temperature at the surface are rapidly transferred through the member to change the temperature at the radiating surface 40. The back surface 40 of the thermal radiation member 20 may be roughened or curved, as illustrated in FIG. 3, to permit the radiation emitted to more closely approximate the radiation emitted by a black body member. Alternatively, the surface 40 may be smooth and the appropriate equations used in the computer based on the shape of the surface 40 to ensure that the temperature of the body 20 is accurately determined, based on its thermal radiation characteristics, as is well known in the art. Preferably, each radiation member 20, 22, etc., will have the same thermal radiating characteristics so that when a ratio is performed, the dimensions cancel out.

Figure 4:
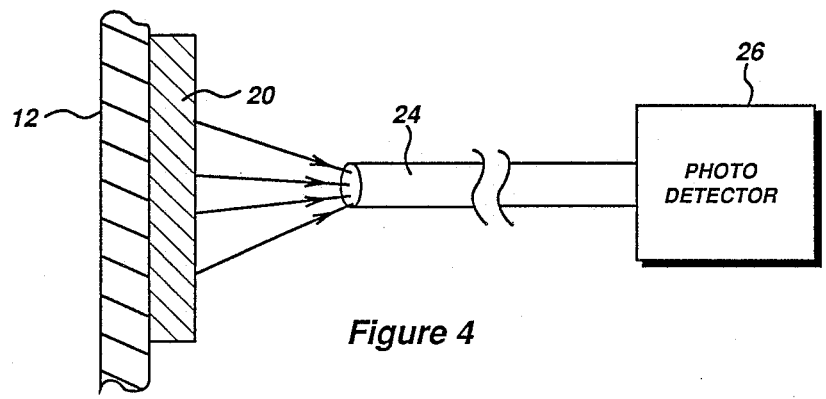
FIG. 4 is a partial cross-sectional view of an alternative embodiment of a thermal radiation member adjacent the aircraft skin and the fiberoptic cable mounted adjacent thereto.

Alternatively, as shown in FIG. 4, the thermal radiation member 20 may be mounted directly behind skin surface 12. Heat is transferred by skin surface 12 to thermal radiation member 20. The thermal radiation member 20 of the embodiment of FIG. 4 is mounted in direct contact with the skin member 12, but not in contact with the external atmosphere. This permits a thermal radiation member 20 to be selected having desired thermal radiation properties over a wide temperature range without having to also withstand the harsh environment of external air friction constantly rubbing across the surface. The temperature drop from the exposed surface across skin member 12 to the back side 40 of member 20 is a constant value which is measurable. The thermal radiation emitted by the member 20 may therefore be used to accurately determine the temperature of the skin surface 12.

While the embodiment of FIG. 4 may be slightly slower in thermal response than the embodiments of FIGS. 2 and 3, the advantages of long operating life and nonexposure to the external environment will, in some applications, offset the disadvantages of slightly slower response time. The skin surface may be made thinner where the radiation member of FIG. 4 attaches to improve the response time. The radiation member 20 of FIG. 4 may be made of an alloy of tungsten or other material having well-known or linear thermal radiation properties. The particular material selected for the thermal radiator 20 of FIG. 4 may be selected based more on the thermal radiation characteristics of the device than on its ability to withstand external operating environments as required in the embodiments of FIGS. 2 and 3. This may provide significant advantages for the embodiment of FIG. 4 in particular environments.

The member 20 of the embodiments of FIGS. 2-4, may be made extremely thin, as thin as a few microns, to further increase the response time of the thermal radiation characteristics across the member 20. Generally, the thinner the member 20, the faster the changes in heat flux will propagate across the member 20 to be sensed and analyzed by the photodetectors 26 and the computer 30 to provide data for controlling the aircraft. If the member is too thin, particularly in embodiments 2 and 3, it will be destroyed by the friction; therefore, an appropriate thickness, based on the type of material used, is selected.

The embodiment of FIGS. 3 and 4 provides the advantage that the member 20 may be a different material than the skin surface 12. The member 20 may be thinner than the skin 12, as illustrated in FIG. 3, or thicker, if desired. A sandwich structure of two or more materials may also be used if desired. The thermal radiation member 20 may be selected based on desired thermal properties, i.e., rapid response time, predictable and linear thermal radiation properties over a wide range of temperatures, and the like. The skin surface of the aircraft may be selected to be a material which is suitable for an aircraft skin surface structural member to withstand high-speed flight conditions even though it has poor properties as a thermal radiation member. For example, the aircraft skin may be made of a titanium alloy, ceramic-metallic composite, stainless steel alloy, and the like; and the radiation member may be made of a tungsten alloy, carbon-carbon, or the like. In the embodiments of FIGS. 3 and 4, the radiation member 20 may be easily removed and replaced as it wears out.

The radiation detectors 26 and 28 have been described as measuring the quantity of photons emitted by thermal radiation members 20 and 22 within a predetermined frequency bandwidth. Alternatively, the radiation detectors may be of the type which determine the temperature of the radiation members 20 and 22 by measuring the frequency change of the emitted radiation.

Rather than using thermal radiation detectors at the end of fiberoptic cables, an alternative approach is to determine the temperature of the aircraft skin using well-known temperature measuring devices. Thermocouples may be mounted adjacent the aircraft skin, such as in direct contact with a surface of the skin, to determine the temperature of the skin. The exact temperature of the skin may therefore be determined and used to determine the attitude of the aircraft according to the methods described with respect to the thermal radiation. As shown by Equation 1, the temperature is proportional to the thermal radiation. Use of a thermocouple to provide a temperature measurement is significantly slower than the use of fiberoptic cables and a photodetector to determine thermal radiation. The time is at least an order of magnitude slower than the time for a measurement of thermal radiation using photodetectors. While the use of fiber optic cables and photodetectors is preferred to measuring the exact skin temperature using thermocouples, both approaches are significantly more advantageous and more reliable than techniques used in present aircraft.

Figure 7:
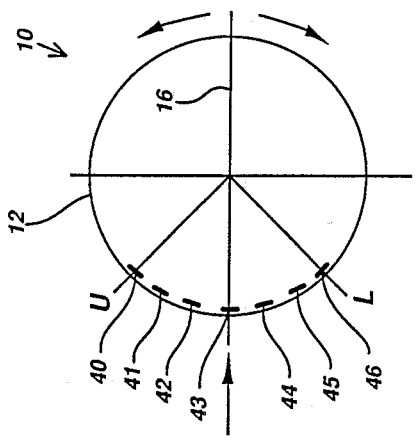
FIG. 7 is a diagram of an embodiment of the invention.

An operating prototype of the invention has been built and tested and found to be successful in accurately measuring to a high degree of precision the attitude of a aircraft member. As shown in FIG. 7, a simulated aircraft member 10 having an upper surface 12 and a lower surface 14 was mounted in a simulated supersonic and hypersonic wind tunnel to determine the accuracy and operation of the invention. In this embodiment, the aircraft member 10 was a stainless steel member having surfaces 12 and 14 exposed to the air. Seven cavities were formed in the rear surface of the stainless steel member 10 spaced a uniform distance from each other to provide thermal radiation members 40, 41, 42, 43, 44, 45, and 46, as shown in FIGS. 2 and 7. The radiation members 40-46 correspond to radiation members 20 and 24 of the previous figures. The sapphire fiberoptic cables were coated with a thin film of aluminum oxide at the tip, which was inserted into the cavity to permit radiation from the cavity to more closely approximate black body cavity radiation. Thermal radiation detectors were mounted at the other end of the respective fiberoptic cables to measure the quantity of thermal radiation emitted from each of the respective thermal radiators 40-46. The thermal radiation detectors 26 were photodetectors supplied by Accufiber, a sensor well known to those in the art. Any other suitable thermal radiation detector may be used.

In addition to the seven fiberoptic cables positioned in the cavities, seven chromel/alumel thermocouples were attached to the rear of the cavities. The thermocouples were used to perform independent tests. Nl-CR strips were tack-welded across the top of all the cavities to firmly retain the fiberoptic cables in position.

The simulated aircraft surface 10 was rotatably mounted in the wind tunnel to simulate various angles of attack of the aircraft during flight maneuvers. The airflow across the aircraft member 10 was varied from Mach numbers below Mach 1 to above 1.6 and the air was preheated to various temperatures in the range range between 1416° R. and 1815° R. Use of a variable Mach number wind velocity in combination with preheating the air to various temperatures permitted the wind tunnel environment to simulate aircraft speeds between Mach 1 and Mach 6.

Figure 6:
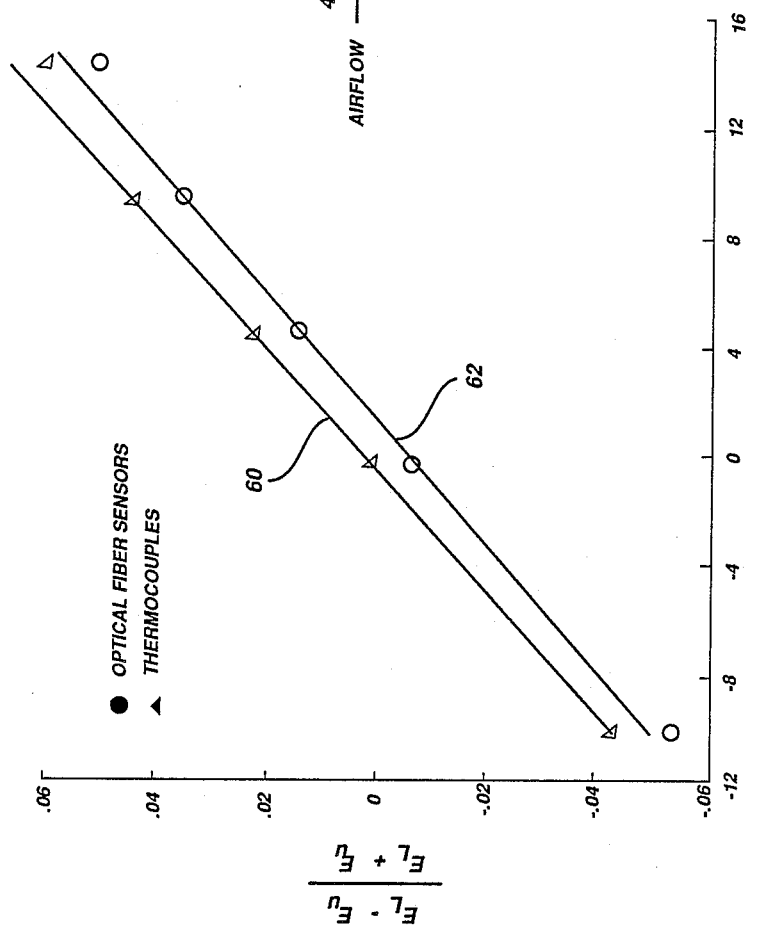
FIG. 6 is a graph of the actual results of tests simulating the operation of the invention on an aircraft.

The information obtained from the test determined the performance of the optical fiber sensors and their sensitivity as to the angle of attack of the aircraft. The simulated aircraft surface member 10 was precision rotated to a known angle of attack and the results obtained were compared to the angle of attack predicted by the measurement from the optical fiber sensors and from the thermocouples over a wide range of air speeds and operating air temperatures. The results of the test are illustrated in FIG. 6. The thermal radiation emitted by a sensor above the center plane 16 was compared to the thermal radiation emitted by a sensor below the plane 16. The difference in thermal radiation emitted by the two sensors was determined and divided by the sum of the thermal radiation emitted by the two members using Equation 2 and shown in FIG. 6. In the event the difference between the two sensors was zero, the output of the ratio was given as zero. Numerous tests were conducted comparing the thermal radiation from one of the members 40-46 to other of the thermal radiation members 40-46 as the device 10 was rotated to various angles of attack.

The test results demonstrated that use of fiberoptic cables to transmit thermal radiation to photosensors provided fast, precise and accurate determination of the angle of attack of a high-speed aircraft. Measurements from the thermcouple devices confirmed that the measurement of thermal radiation using the photodetectors was accurate and reliable. The test also showed that use of thermocouples to directly measure the temperature of the skin member provided precise, accurate and reliable aircraft attitude data. The difference between the curve 60 of the thermocouple devices and curve 62 of the fiberoptic system is based on the differences in mounting between the fiberoptic cables and the thermocouples. Appropriate mounting techniques, coupled with the use of appropriate constants based on the difference between actual thermal radiation from the body and ideal radiation based on a black body cavity, may be used to calibrate the system for use on an aircraft. The calibration parameters for the fiber-optical system are sensitive to the installation of the fiberoptic cables and sensors. Some data scatter did occur in the measurements at the upper and lower ends of the graph, as illustrated in FIG. 6, based on the installation of the fiberoptic cables and thermocouples in the simulated member 10 of FIG. 7.

Figure 8:
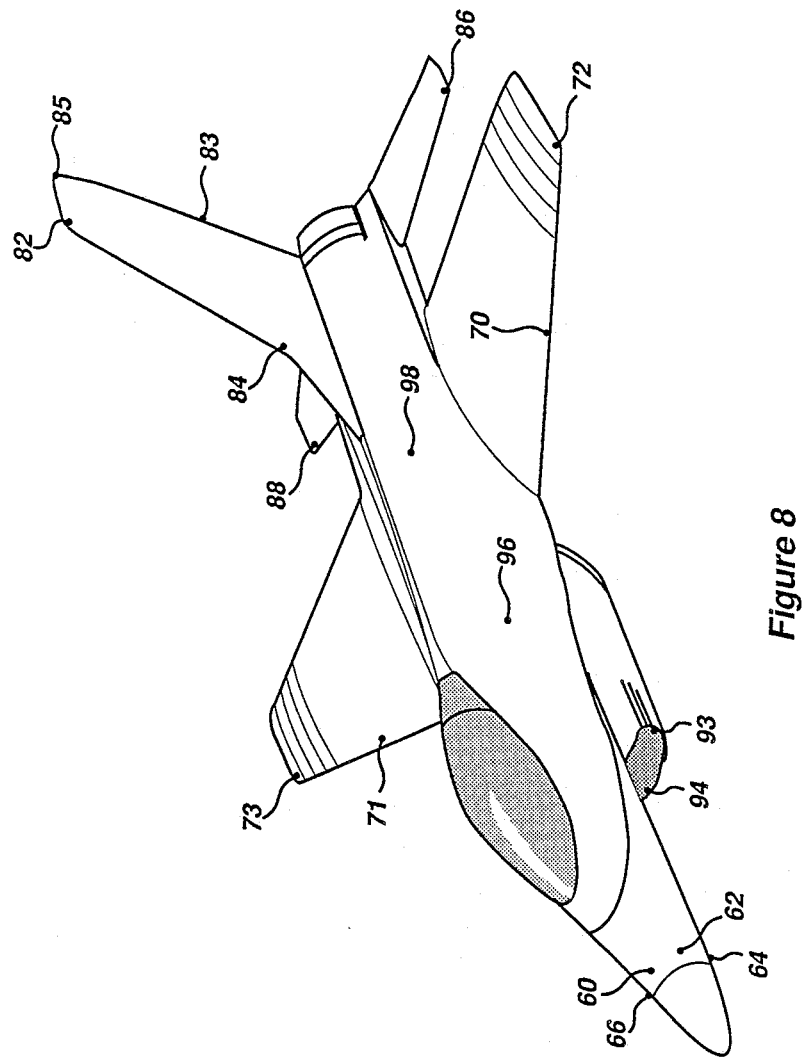
FIG. 8 is an isometric view of the top side of an aircraft showing various locations for measuring thermal radiation.
Figure 9:
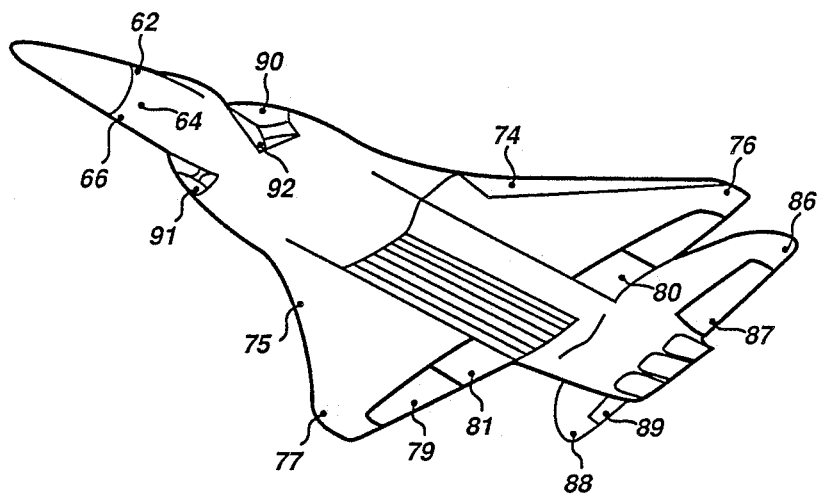
FIG. 9 is an isometric, bottom side view of an aircraft showing various locations for measuring thermal radiation.

FIGS. 8 and 9 illustrate the various locations that thermal radiators may be placed to sense flight parameters of the aircraft. The thermal radiation members 20 may be placed at any desired location on the aircraft to determine the temperature of the aircraft, the velocity of the aircraft, and the status of any particular portion of the aircraft. As shown in FIG. 8, four radiation members 60, 62, 64 and 66 are positioned near the leading edge of the nose of the aircraft, spaced an equal distance from each other around the radius of the nose of the aircraft. Upper and lower radiation members 60 and 64 permit the pitch attitude of the aircraft to be accurately and precisely determined. Radiation detectors 62 and 66 permit the yaw attitude of the aircraft to be accurately determined.

Additional thermal radiation devices having respective fiberoptic cables and photodetectors coupled thereto may be positioned at various locations on the aircraft to determine the status of various aircraft members to aid the pilot and computer in control of the aircraft. For example, thermal radiation members 70, 72, 74 and 76, as shown in FIGS. 8 and 9, positioned along the leading edges of the wing members, both top and bottom, permit the angle of attack of the wings to be precisely determined. Accurate wing measurement angle of attack may be important for an advance hypersonic fighter plane having a wing whose angle of attack may be significantly different from the angle of attack of the nose of the aircraft. The sensors 70–81 positioned on various wing surfaces may be used to determine the status of the ailerons, flaps, wing tips or the like to provide important information for control of the aircraft, particularly during turns. Additional members 82–89 mounted on the rudder or elevators provide information to the pilot on the status of these particular members. For example, the attitude of the rudder, elevator or other members of the tail assembly may be independently sensed and provided to permit control of the aircraft at high speed. Radiation members 90–98 may be placed along the fuselage or at other locations, as desired, to determine the status of these portions of the aircraft.

What is claimed is:

1. A device for sensing an aircraft flight parameter, comprising:
 a first member having a first surface exposed to ambient air as said aircraft flies through said air;
 a second member having a first surface exposed to ambient air as said aircraft flies through said air;
 a fiberoptic cable adjacent a second surface of said first member;
 a fiberoptic cable adjacent a second surface of said second member;
 a photodetector for sensing the radiation emitted from said respective second surfaces; and
 means for analyzing the radiation emitted by said first member with the radiation emitted by said second member to determine said aircraft flight parameter.

2. The device according to claim 1 wherein a cavity is formed in said respective members and said fiberoptic cable is retained in said cavity, abutting said members.

3. The device according to claim 1 wherein said fiberoptic cable is spaced from said respective members.

4. The device according to claim 1 wherein said second surface is rough compared to said first surface to improve the thermal radiation characteristics of said member.

5. The device according to claim 1 wherein said member includes a plurality of different materials, a first material being exposed to said air and a second material being in contact with said first material, said second material having said second surface.

6. The device according to claim 1 further including a layer of aluminum oxide on said fiberoptic cable.

7. The device according to claim 1 wherein said members are removably mounted in said aircraft.

8. The device according to claim 1 wherein said analyzing means includes a summing means for summing said radiation and means for determining a velocity of said aircraft.

9. The device according to claim 1 wherein said analyzing means includes comparing means for comparing said radiation and means for determining an attitude of an aircraft member.

10. The method of determining an aircraft flight parameter, comprising:
 sensing thermal radiation emitted by a first member;
 sensing thermal radiation emitted by a second member; and
 analyzing the thermal radiation emitted by said first member with the thermal radiation emitted by said second member to determine said aircraft flight parameter.

11. The method according to claim 10 wherein said analyzing step includes comparing thermal radiation from said first member with the thermal radiation from said second member and wherein said aircraft flight parameter is an attitude of an aircraft member.

12. The method according to claim 11 wherein said attitude is the aircraft pitch.

13. The method according to claim 11 wherein said attitude is the aircraft yaw.

14. The method according to claim 11 wherein said attitude is the aircraft roll.

15. The method according to claim 10, further including the step of sensing thermal radiation emitted by a third member and analyzing the thermal radiation emitted by said first, second and third members.

16. The method according to claim 11 wherein said comparison step includes determining the difference between the radiation emitted by said first and second members.

17. The method according to claim 11 wherein said comparison step includes determining the ratio of the difference of the radiation emitted by said first and second members divided by the sum of the radiation emitted by said first and second members.

18. The method according to claim 10 wherein said member is positioned on the skin of an aircraft.

19. The method according to claim 10 wherein said member is positioned adjacent the skin of an aircraft and coupled to the skin of said aircraft.

20. The method according to claim 10 wherein said analzying step includes summing the radiation emitted by said first and second members.

21. The method according to claim 20 wherein said aircraft flight parameter is velocity.

22. The method according to claim 10, further including determining the angle of attack of the wings of said aircraft.

23. The method of determining an aircraft attitude, comprising:
 sensing a first skin temperature of said aircraft at a first location;
 sensing a second skin temperature of said aircraft at a second location; and
 comparing said first skin temperature to said second skin temperature to determine said aircraft attitude.

24. The method according to claim 23 wherein said skin temperatures are sensed using temperature measuring devices coupled to each of said skin members.

25. The method according to claim 23 wherein said skin temperatures are sensed by measuring the thermal radiation emitted by said skin at said respective locations.

26. The method according to claim 23 wherein said skin temperatures are sensed by temperature measuring devices in thermal contact with said respective skin members.

27. The method according to claim 23 wherein the step of sensing said skin temperatures includes sensing the temperature of a member adjacent said skin at said respective locations.

* * * * *